US008568223B2

(12) United States Patent
Yoshizawa et al.

(10) Patent No.: US 8,568,223 B2
(45) Date of Patent: Oct. 29, 2013

(54) GAMING MACHINE AND GAMING METHOD THEREOF

(75) Inventors: Kazumasa Yoshizawa, Tokyo (JP); Yoichi Kato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1554 days.

(21) Appl. No.: 11/902,481

(22) Filed: Sep. 21, 2007

(65) Prior Publication Data

US 2008/0076541 A1 Mar. 27, 2008

(30) Foreign Application Priority Data

Sep. 22, 2006 (JP) ................................ 2006-256643

(51) Int. Cl.
*G06F 17/00* (2006.01)

(52) U.S. Cl.
USPC .................. 463/26; 463/16; 463/20; 463/32; 709/203

(58) Field of Classification Search
None
See application file for complete search history.

(56) References Cited

U.S. PATENT DOCUMENTS

| | | | | |
|---|---|---|---|---|
| 5,221,083 | A * | 6/1993 | Dote | 463/32 |
| 6,007,424 | A | 12/1999 | Evers et al. | |
| 7,128,651 | B2 * | 10/2006 | Miyamoto et al. | 463/35 |
| 2002/0094856 | A1 * | 7/2002 | Bennett et al. | 463/16 |
| 2002/0094869 | A1 * | 7/2002 | Harkham | 463/42 |
| 2003/0078101 | A1 * | 4/2003 | Schneider et al. | 463/42 |
| 2003/0144052 | A1 * | 7/2003 | Walker et al. | 463/20 |
| 2003/0176211 | A1 * | 9/2003 | Sommerville | 463/16 |
| 2004/0002377 | A1 * | 1/2004 | Staw et al. | 463/25 |
| 2004/0063482 | A1 * | 4/2004 | Toyoda | 463/11 |
| 2004/0072602 | A1 * | 4/2004 | Toyoda | 463/10 |
| 2005/0014546 | A1 * | 1/2005 | Nara | 463/13 |
| 2005/0049045 | A1 * | 3/2005 | Abe et al. | 463/31 |
| 2005/0096121 | A1 * | 5/2005 | Gilliland et al. | 463/20 |
| 2005/0107148 | A1 * | 5/2005 | Webb | 463/13 |
| 2005/0143166 | A1 * | 6/2005 | Walker et al. | 463/25 |
| 2006/0084505 | A1 | 4/2006 | Yoseloff et al. | |
| 2006/0136964 | A1 * | 6/2006 | Diez et al. | 725/37 |
| 2006/0217199 | A1 * | 9/2006 | Adcox et al. | 463/40 |
| 2006/0221195 | A1 * | 10/2006 | Sohmers | 348/211.11 |
| 2006/0258425 | A1 * | 11/2006 | Edidin et al. | 463/16 |
| 2007/0032296 | A1 * | 2/2007 | Nakamurai | 463/30 |
| 2007/0155465 | A1 * | 7/2007 | Walker et al. | 463/16 |
| 2007/0202937 | A1 * | 8/2007 | Peires et al. | 463/9 |
| 2008/0102916 | A1 * | 5/2008 | Kovacs et al. | 463/16 |
| 2008/0125221 | A1 * | 5/2008 | Ward et al. | 463/32 |
| 2008/0195699 | A1 * | 8/2008 | Min et al. | 709/203 |
| 2009/0011819 | A9 * | 1/2009 | Huard et al. | 463/25 |
| 2011/0117979 | A1 * | 5/2011 | Hemstead et al. | 463/12 |

FOREIGN PATENT DOCUMENTS

| | | | |
|---|---|---|---|
| JP | 2003117242 A | * | 4/2003 |
| JP | 2005-237857 | | 9/2005 |
| JP | 2005-334538 | | 12/2005 |

* cited by examiner

*Primary Examiner* — Paul A D'Agostino
(74) *Attorney, Agent, or Firm* — Edwards Wildman Palmer LLP

(57) ABSTRACT

A gaming environment is described. Each of values which betted by a player is compared. One of the players, who betted the largest accumulated value, can obtain a right of choice for a dealer image (or actual dealer). A game session is conducted by the selected dealer (or actual dealer).

23 Claims, 11 Drawing Sheets

GAMING MACHINE AND GAMING METHOD THEREOF

CROSS-REFERENCE TO RELATED APPLICATIONS

This application is based upon and claims a priority from the prior Japanese Patent Application No. 2006-256643 filed on Sep. 22, 2006, the entire contents of which are incorporated herein by reference.

BACKGROUND

1. Field

One or more aspects of the present invention relate to a multi-player game machine in which plural players play games, and a gaming method thereof. More particularly, one or more aspects of the present invention relate to the multi-player game machine and the gaming method thereof in which a player who bets the most accumulated amount of bet value can select dealer's image among plural images.

2. Description of Related Art

Conventionally, at casinos, game arcades and the like, card game machines and tables in which a dealer and plural players play card games. The card games are Poker including Pai Gow Porker, Holdem Poker, and 7 Stad Porker, Baccarat, and Blackjack. The card games are played with the use of card having marks (for example, ace of heart). Award to be provided to the player is determined based on a combination of the mark of the card dealt to the player and a combination of the mark of the card dealt to the dealer.

In the Pai Gow Porker, seven cards are dealt to the dealer and plural players (six players at maximum), and the dealer and the players assemble a two card and a five card. Win or loss, and an award are determined based on a combination of the mark displayed on the card of each hand.

In some conventional examples of card game machines and gaming method thereof, to enhance the feeling of being a real thing, dealer's image are displayed on the display devices. However, the dealer's images are always the same, that is, same dealer image having same costume are displayed. Also, in some card game machines, dealers and costumes are changed, however, dealers and costumes are determined randomly.

Accordingly, in above examples, the player can select dealers and clothes, so player's needs that the players want to change dealer's images are not met. And, the needs are not motivation of player's bet.

SUMMARY

One or more aspects invention related to a gaming machine, a gaming method thereof, a computer readable medium having computer-executable instructions or the like which are nonconventional and provide new entertainment. Also, in one or more aspects of the present invention, Each of values which betted by a player is compared. One of the players, who betted the largest accumulated value, can obtain a right of choice for a dealer image (or actual dealer). A game session is conducted by the selected dealer (or actual dealer). One or more of the above aspects of the invention will be more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

DETAILED DESCRIPTION

Figure 1:
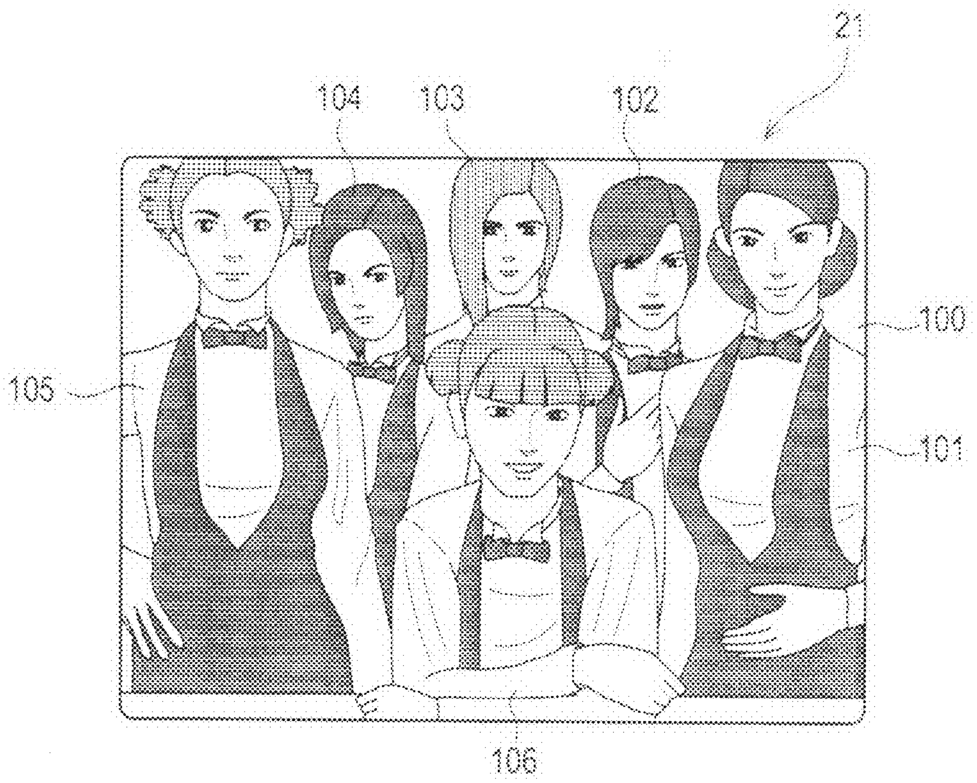
FIG. 1 is a view showing a dealer choice screen in accordance with one or more aspects of the present invention.

The various aspects summarized previously may be embodied in various forms. The following description shows by way of illustration of various combinations and configurations in which the aspects may be practiced.

It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine according to one or more aspects of the invention will be described in detail with reference to the drawings based on an embodiment embodying one or more aspects of the invention as a baccarat game machine. However, it is appreciated that one or more aspects of the present invention may be embodied in distributable (via CD and the like) or downloadable software games, console games, and the like. In this regard, the gaming machine may be a virtual gaming machine that is displayed on a multi-purpose computer and/or dedicated kiosk.

Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU" and "processor" are inclusive by nature, including at least one of hardware, software, or firmware.

These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

An embodiment embodying a multi-player game machine in one or more aspects of the invention as a baccarat game machine will be described in detail with reference to the drawings below. The baccarat game machine of the embodiment is a type of multi-player game machines that have plural player terminals. In the baccarat game, each player bets either "Banker" or "Player" based on that the player handicaps the game, and the payout is provided based on the game result.

And, the baccarat game machine of one or more present invention, a virtual dealer image, which conducts the game session, may be selected among plural images (in FIG. 1, six kinds of images, first dealer image 101 to sixth dealer image 106). That is, a character, which conducts the game session, may be selected among plural kinds of characters. The game is played with the selected dealer image 101 to 106 being displayed on a front display 21 (see FIGS. 8 and 9). Also, in the baccarat game machine of one or more present invention are characterized in that, the right of dealer image's selection is provided the player who bets largest amount during before ten to twenty games (for example).

Figure 2:
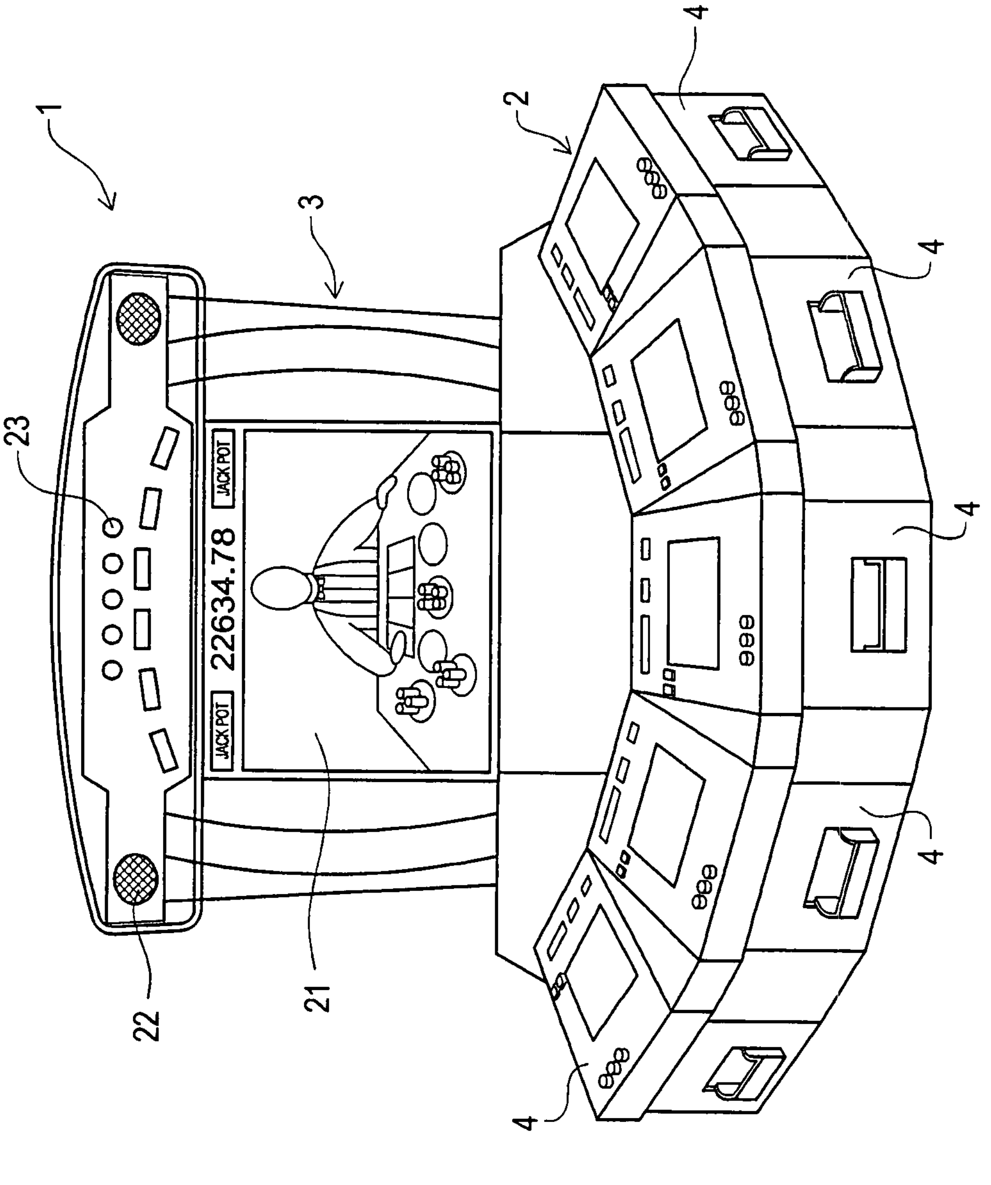
FIG. 2 is a perspective view showing a baccarat game machine in accordance with one or more aspects of the present invention.

At first, a simple construction of the baccarat game machine 1 of the embodiment will be described with reference FIG. 2. FIG. 2 is a perspective view of the baccarat game machine of the embodiment. The baccarat game machine 1 of the embodiment may basically include table portion 2, a panel portion 3. The players sit around the table portions 2 and play games with the use of the table portions 2. The panel portion 3 is arranged behind the table portions 2. Virtual dealer's animation images or the like are displayed on the panel portion 3.

Figure 3:
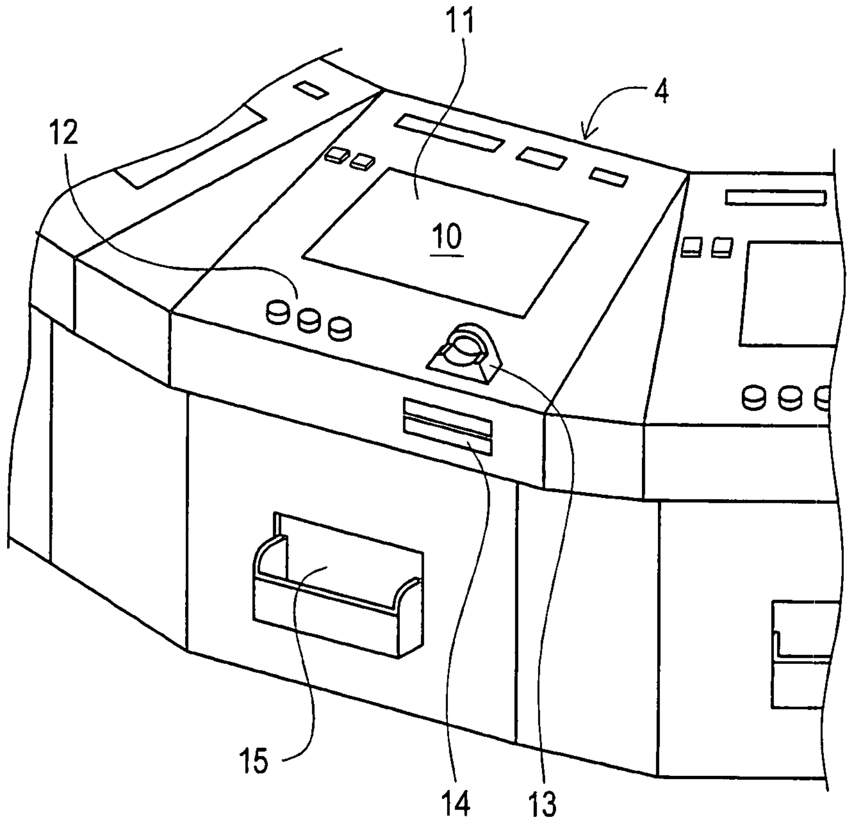
FIG. 3 is a perspective view showing a player terminal in accordance with one or more aspects of the present invention.

At first, the table portion 2 will be described. On the table portion 2, plural player terminals 4 (in FIG. 2, five player terminals) called a station are arranged with almost fan-shape. FIG. 3 is a perspective view of one player terminal 4 of the embodiment.

As shown in FIG. 3, the player terminal 4 includes liquid crystal display 10, a touch panel 11, an operation button 12, a coin insertion portion 13, a bill insertion portion 14, and a coin tray 15. Abet screen (see FIG. 6) which will be described later and game result or the like are displayed on the liquid crystal display 10. The touch panel 11 is arranged in front of the liquid display 10. The touch panel 11 is used when the player selects a button displayed on the liquid crystal display 10 at a choice operation of bet object or setting bet value. The touch panel 11 is used when the player selects the dealer image if the player obtains the right of choice. The operation button 12 is used when the player operates a payout or the like. The coin or the medal are inserted the coin insertion portion 13. The bills are inserted to the bill insertion portion 14. When the operation of payout is made, the coins or the medals corresponding to accumulated credit are provided through the coin tray 15.

A panel portion 3 includes a front display 21, a loud speaker 22, and LED 23. The dealer image that deals the cards and exchanges chips, and contents of dealt cards are displayed on the front display 21. The loud speaker 22 is arranged on the top of the front display 21, and outputs a music and sound effect according to the game session.

And, in the baccarat game machine 1 constructed of mentioned above, the players sit in front of the player terminal 4 and bet either "Banker" or "Player" with the use of the bet screen displayed on the liquid crystal display 10. After that, an effect image, which determines the winner of either "Banker" or "Player" (tie, in some case) based on the card dealt to the dealer, is displayed on the front display 21. The player terminal 4 provides credit with predetermined value, which is based on bet value (credit count) and odds, to the player who bet determined winner. Here, if the number of executed games becomes the predetermined number (which is determined by lottery), the player, who bet the largest amount bet value during the executed games, will obtain the right of choice. After that, the dealer choice screen 100 shown in FIG. 1 is displayed on the liquid crystal display 4 of the player terminal 4 of the player obtained the right of choice. Here, same dealer choice screen 100 is also displayed on the front display 21. The player terminal 4 can accept a choice operation. After that, if desired dealer image is selected among the six kinds (for example) of dealer images 101 to 106 displayed on the dealer choice screen 100 with the player of the touch panel 11, dealer image of selected dealer which conducts the game session is displayed. Here, choice of dealer image may be enabled based on the operation button 12 of the player terminal 4.

Figure 4:
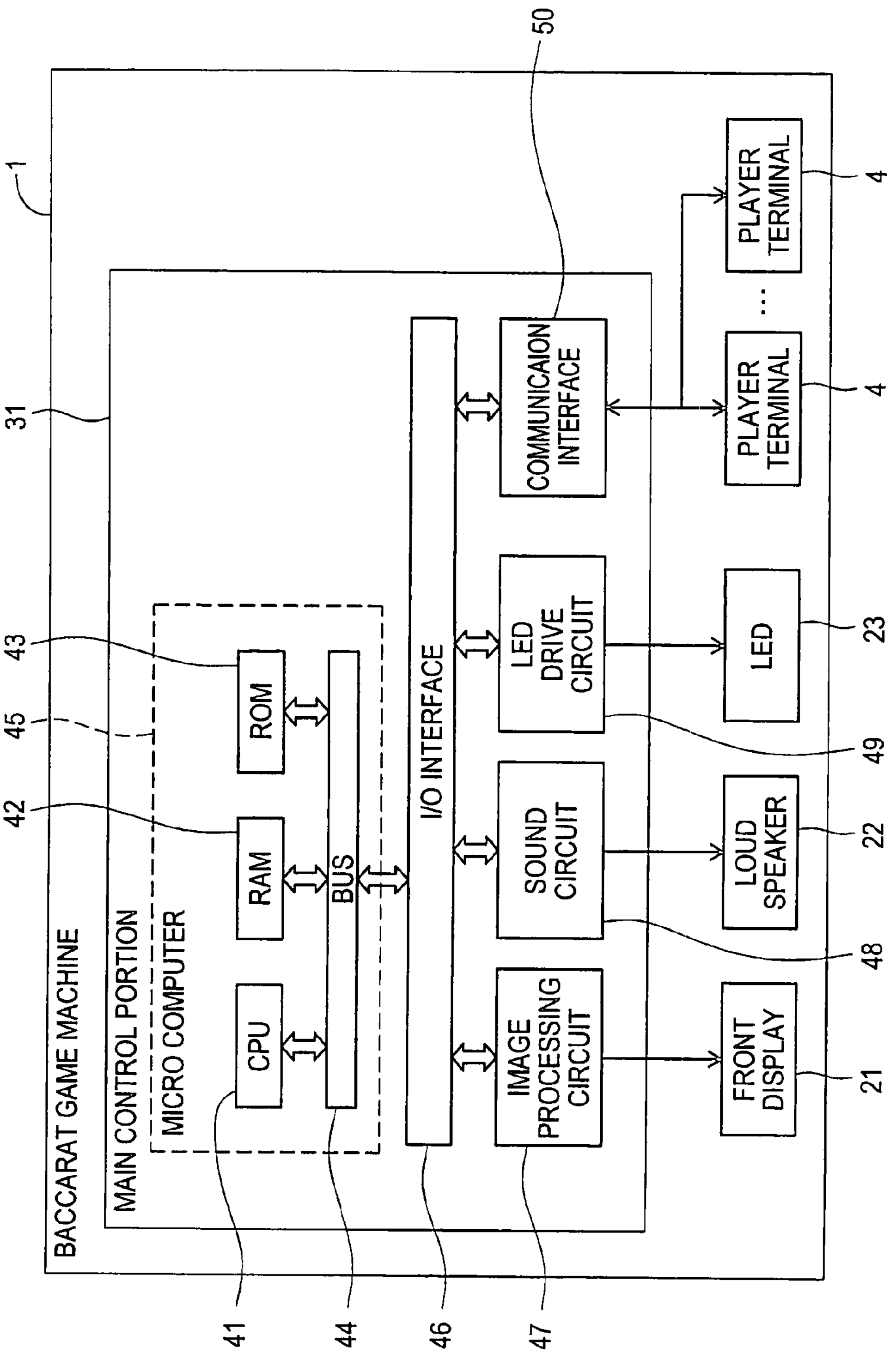
FIG. 4 is a block diagram schematically showing a control system of the baccarat game machine.

A construction of a control system of the baccarat game machine 1 will be described with reference to FIG. 4. FIG. 4 is a block diagram schematically showing the control system of the baccarat machine 1 of the embodiment.

The baccarat game machine 1 of the embodiment includes a main control portion 31, plural player terminals 4, and various peripheral device. The plural player terminals 4 and the various peripheral devices are connected to the main control potion 31.

The main control portion 31 may basically include a microcomputer as a core. The microcomputer is composed of a CPU 41, RAM 42, ROM 43, and bus 44. Data is transferred each other via the bus 44. In the ROM 43, various programs, data tables, and the like, which are used to execute for controls of the baccarat game machine 1, are stored. In the RAM 42, various data operated by the CPU 41 is temporarily stored. In the ROM 43, six kinds of dealer images 101 to 106 composed of different characters, and various kinds of costume images worn by the virtual dealer.

The CPU 41 is connected to a image processing circuit 47, a sound circuit 48, a LED drive circuit 49, a communication interface 50 via a I/O interface 46.

The main control portion 31 receives the bet operation information (such as bet value) by the player, from the each of the player terminals 4. And then, the main control portion 31 determines whether or not the condition of game-start is met. When the game is started, the game result ("Dealer wins", "Player wins", or tie) is determined and the determined game result is sent to each of the player terminals 4. And then, each of the player terminals 4 increases or decreases the accumulated credit based on the game result received from the main control portion 31.

And, the control portion 31 drive-controls the output of image signal to be displayed on the front display 21, the loud speaker 22, and the LED 23. Especially, if the main control portion 31 receives the choice information from the player terminal 4, the main control potions 31 sets the selected image among six kinds of images, as virtual dealer image and costume image wore by the virtual dealer. And, at following games, the main controller portion 31 controls the front display 21 so that the dealer image and costume image, which are set, are displayed thereon.

Figure 5:
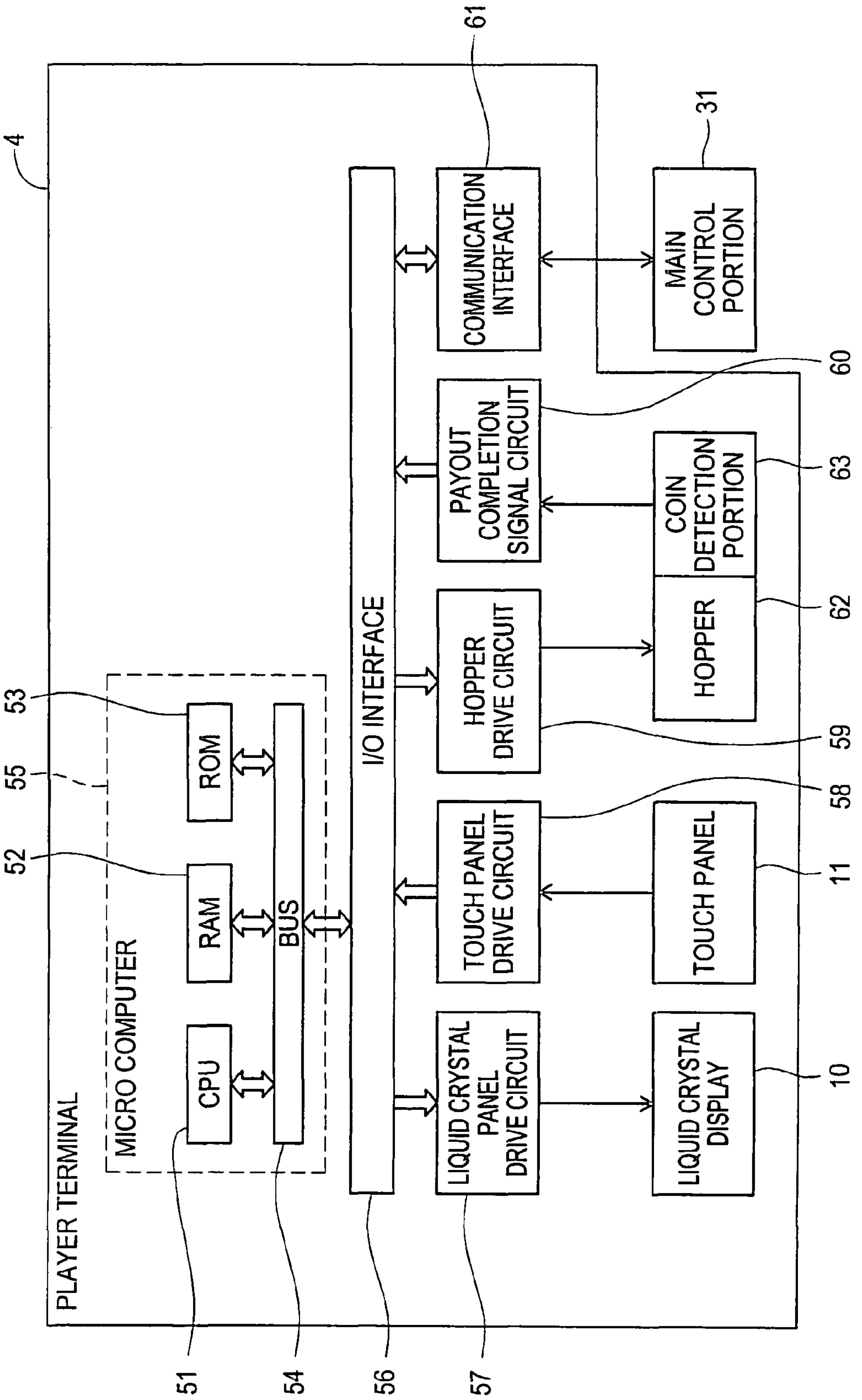
FIG. 5 is a block diagram schematically showing a control system of the player terminal.

A construction of control system of the player terminal 4 will be described with reference to FIG. 5. FIG. 5 is a block diagram schematically showing the control system of the player terminal 4 of the embodiment.

As shown in FIG. 5, the player terminal 4 of the embodiment is basically includes a microcomputer 55 as a core. The microcomputer includes a CPU 51, RAM 52, ROM 53, and bus 54. Data is transferred each other via the bus 54. In the ROM 53, various programs, data tables, and the like, which are used to execute for controls of the player terminal 4, are stored. In the RAM 52, the credit count currently stored in the player terminal 4, the bet object which is bet by the player, the bet value (credit count) which the player bets the bet object, odds, and various data operated by the CPU 51 are temporarily stored.

The CPU 51 is connected to a liquid crystal panel drive circuit 57, a touch panel drive circuit 58, a hopper drive circuit 59, a payout completion signal circuit 60, and a communication interface 61. The liquid display 10 is connected to the liquid panel drive circuit 57. The touch panel 11 is connected to the touch panel drive circuit 58. The hopper 62 is connected to the hopper drive circuit 59. The coin detection portion 63 is connected to the payout completion signal circuit 60.

The CPU 51 determines the bet object (either "Banker" or "Player") and bet value (credit count) based on the operation information which is output form the touch panel 11, and the determined bet object and bet value are stored in the RAM 52 and sent to the main control portion 31. Further, the CPU 51 increases or decreases the accumulated credit based on the game result which is sent from the main control potion 31.

And, the CPU 51 controls output for image signal corresponding to the image to be displayed on the front display 21, a paying out of coins from the coin tray 15 based on the hopper 62 and the coin detection portions 63.

Figure 6:
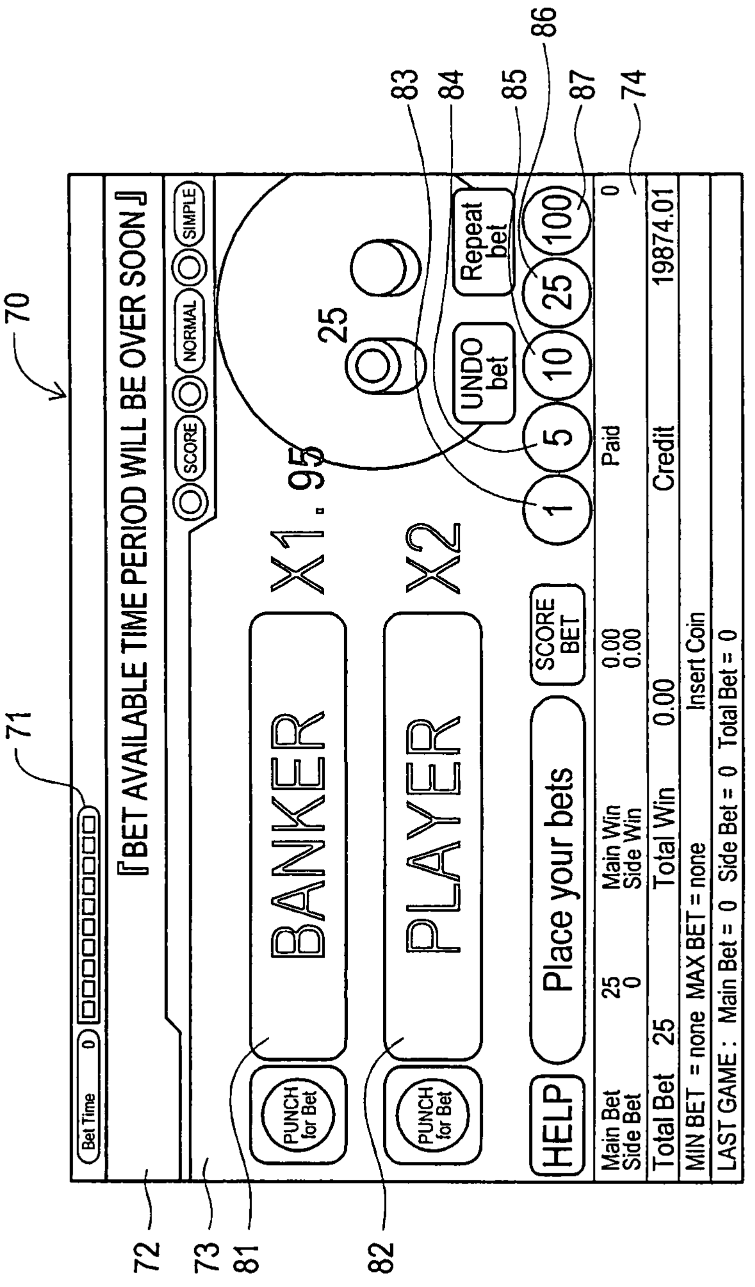
FIG. 6 is a view showing a bet screen displayed on a liquid display of the player terminal.

A bet screen 70 will be described with reference to FIG. 6. If the player plays the baccarat game at the baccarat game machine 1 of the embodiment, the bet screen 70 is displayed on the liquid display 10 of the player terminal 4. FIG. 6 schematically shows a bet screen displayed on the liquid display 10 of the player terminal 4. Here, in the baccarat game machine 1 of the embodiment, the player may make the bet operation with the use of the bet screen and touch panel 6. In the bet operation, the player bets desired credits on either "Banker" or "Player".

As shown in FIG. 6, in the bet screen 70, a timer display portion 71 and a comment display portion 72, and main display portion 73, and an information display portion 74. The remaining bet available time period is displayed on the timer display portion 71. A balance bet value on which each of the bet object is bet, an announcement, or the like are displayed on the comment display portion 71. The bet object on which the player can bet, the game result, or the like are displayed on the information display portion 74.

Area buttons 81 and 82 are arranged in the main display portion 73. If the area buttons 81 is operated by the player, it is determined the bet object is "Banker". And, if the area button 82 is operated by the player, it is determined the bet object is "Player".

Further, on the right side of the area buttons 81 and 82, the odds may be displayed. If the bet object which is betted by the player is won, the number of credit, in which the bet value is multiplied by odds, will be provided.

Bet buttons 83 to 87 are arranged in the main display portion 73. If the player selects the bet button 83, the bet object is bet one more credit. If the player selects the bet button 84, the bet object will be bet five more credits. If the player selects the bet button 85, the bet object will be bet ten more credits. If the player selects the bet button 86, the bet object will be bet twenty-five more credits. If the player selects the bet button 87, the bet object will be bet one-hundred more credits.

Figure 7A:
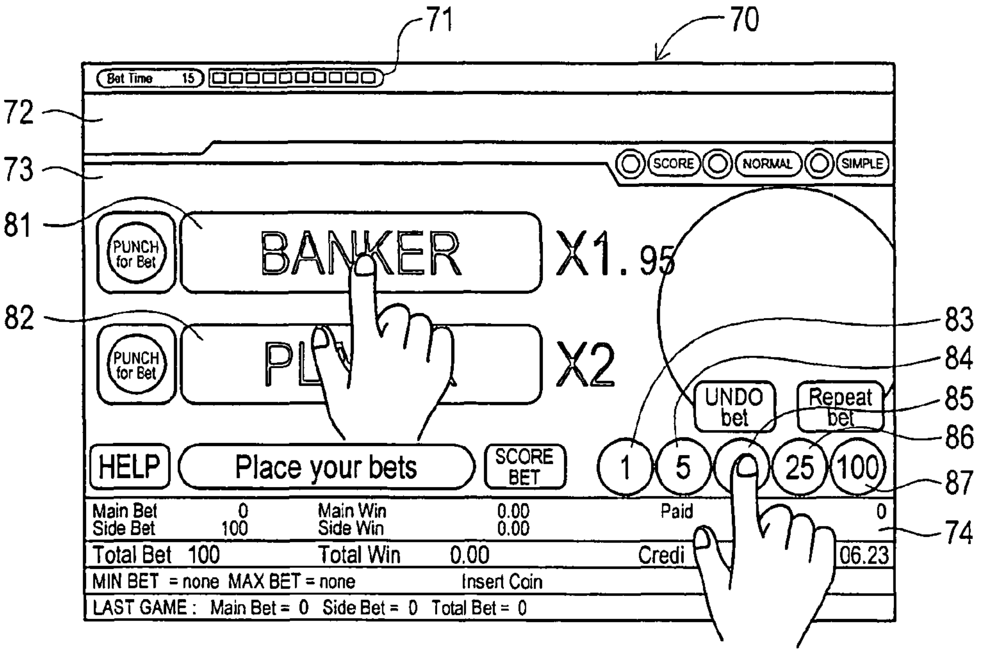
FIG. 7A is a view showing an operation method and the bet screen when "10 credits" is bet on "Banker" which is a bet object.
Figure 7B:
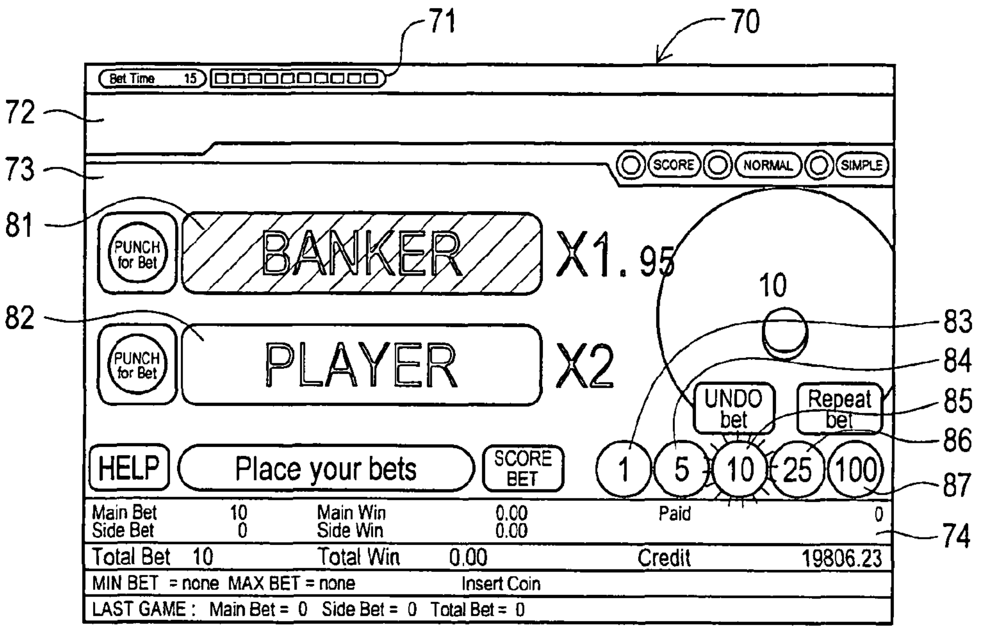
FIG. 7B is a view showing the operation method and the bet screen when "10 credits" is bet on "Banker" which is the bet object.

For example, FIGS. 7A and 7B show an operation method and a bet screen when "10 credits" is bet on "Banker", which is the bet object, as a concrete example. As shown in FIG. 7A, if the player touches the bet button 85 and the area button 81 with player's finger, "10 credits" is bet on "Banker" (see FIG. 7B).

On the other hand, in the comment display portion 72, the massages, which support the game sessions, are displayed. For example, if the remaining bet available time period becomes below five seconds, the comment of "BET AVAILABLE TIME PERIOD WILL BE OVER SOON" will be displayed. And, if the remaining bet available time period becomes zero second, the comment of "BET AVAILABLE TIME PERIOD IS OVER" will be displayed.

The main screen 91, which is displayed on the front display 21 when the baccarat game executed in the baccarat game machine 1 of the embodiment, will be described with reference to FIGS. 8 and 9.

Figure 8:
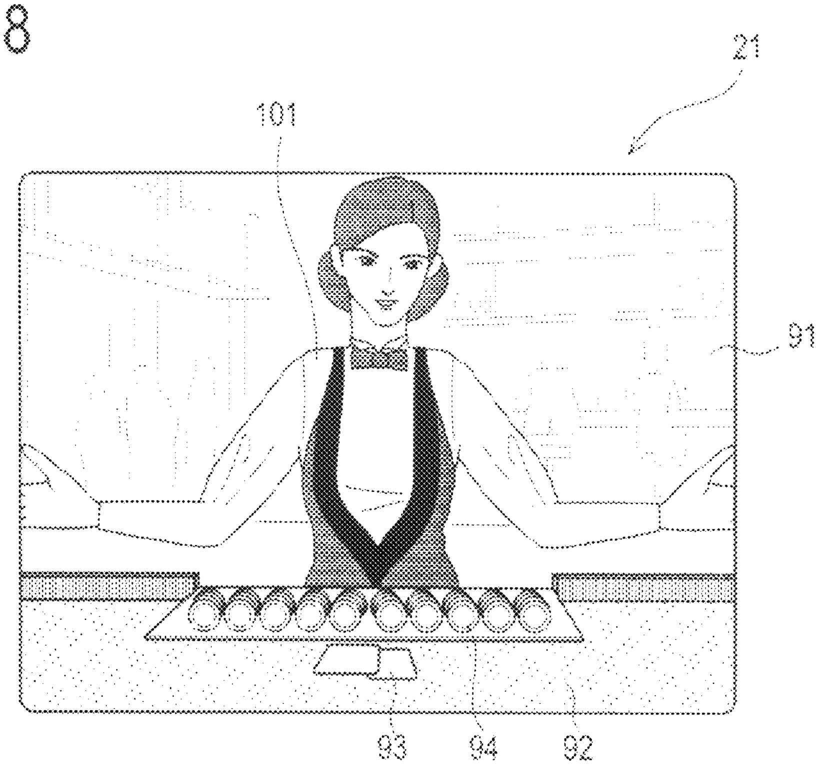
FIG. 8 is a main screen in a case where a first dealer image 101 is selected.
Figure 9:
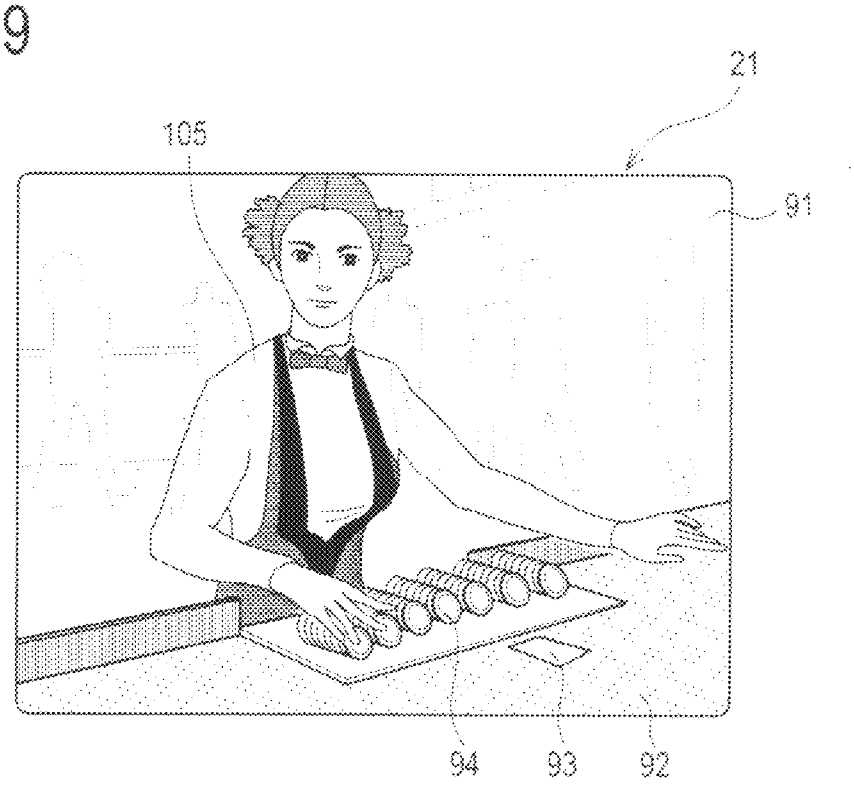
FIG. 9 is the main screen in a case where a fifth dealer image 105 is selected.

FIGS. 8 and 9 show the main screen 91 displayed on the front display 21. Here, in the baccarat game machine 1 of the embodiment, to enhance the feeling of being a real thing, virtual dealer images, which acts animations such as dealing of cards, are displayed on the main screen 91 according to the game session. The dealer image is changed to different kinds of image based on the player's choice at a predetermined interval. Concretely, on the main screen 91, the dealer image, which is selected among the different six kinds of character image by the player who obtains the right of choice on the dealer choice screen 10, will be displayed in subsequent games with the selected costume image. FIG. 8 shows the main screen 91 in a case where the first dealer 101 is selected and a normal bow tie image is selected by the player. FIG. 9 shows the main screen 91 in a case where the fifth dealer 105 is selected.

A game table image 92, a dealer's card image 93, and tips images 94 are displayed on almost center of the main screen 91. The dealer's image 93 indicates dealer's hand which is dealt to the dealer. The tips image 94 indicates situations which the dealer and the player exchange the tips each other. According to the game sessions, dealer image (any of 101 to 106) deals the cards and exchange tips on the game table.

Figure 10:
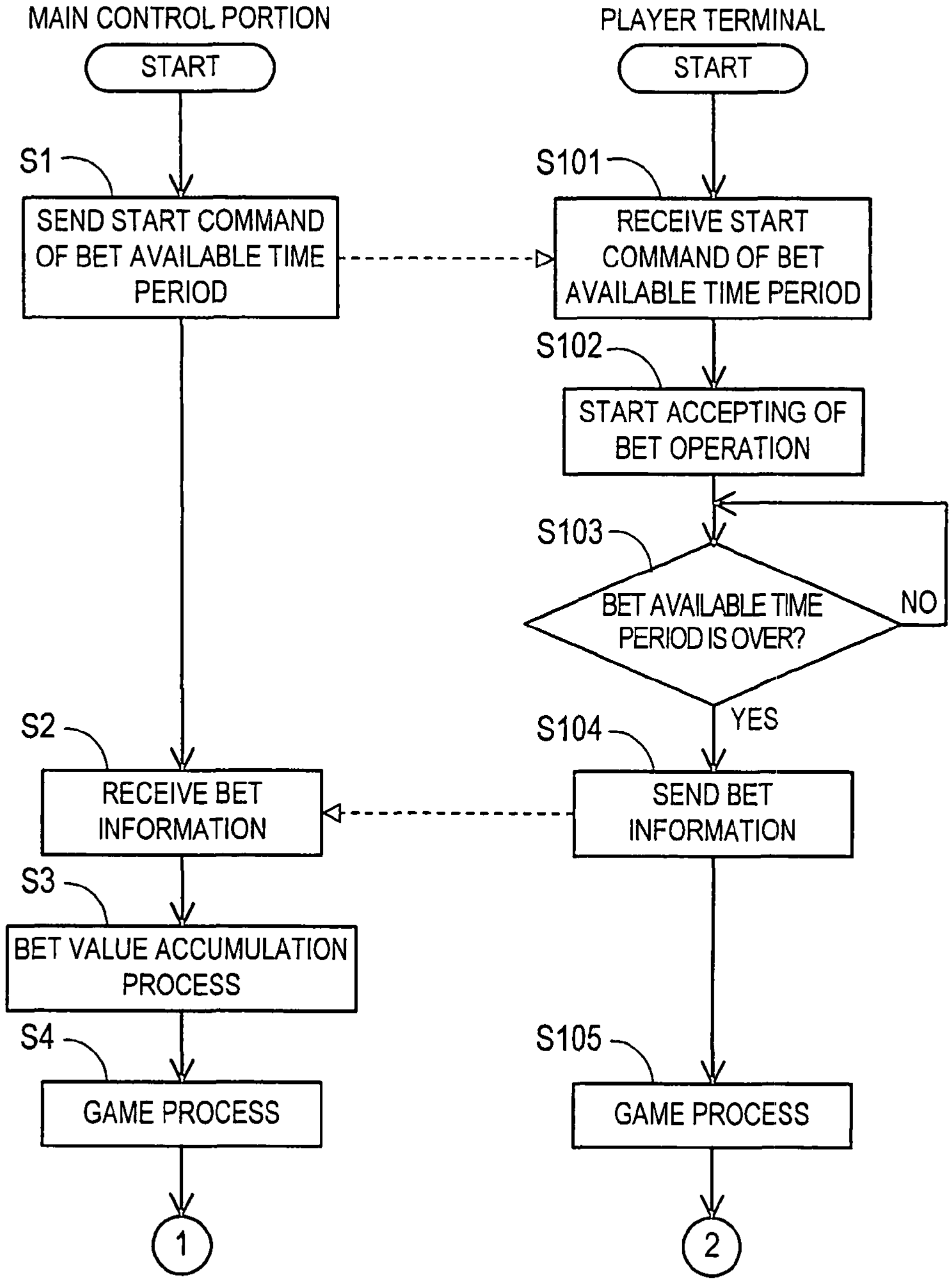
FIG. 10 is a part of a flowchart of a main game process executed in the baccarat game machine.
Figure 11:
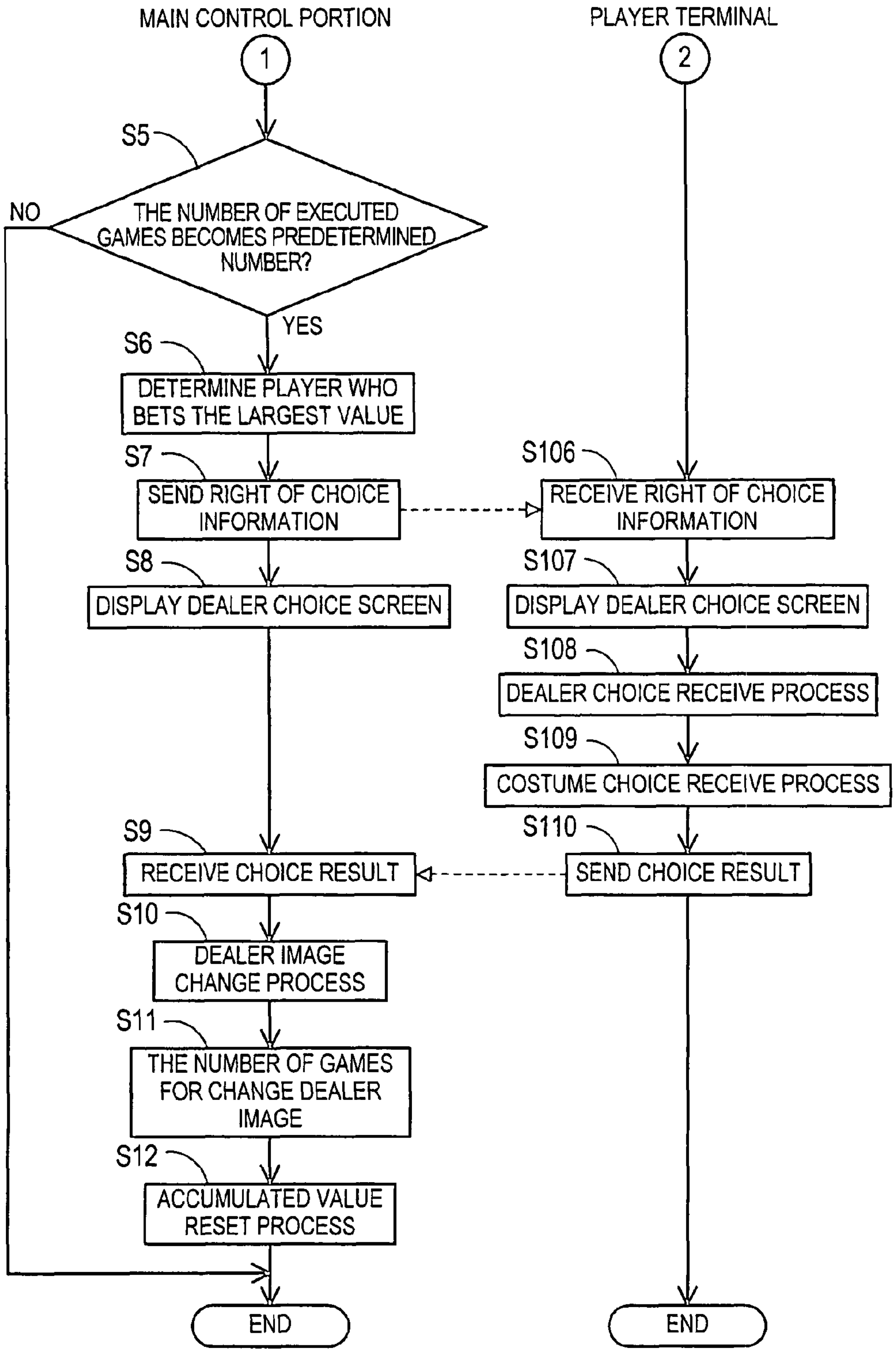
FIG. 11 is the part of the flowchart of a main game process executed in the baccarat game machine.

The main game process program executed by the CPU 41 of the main control portion 31 on the baccarat game machine 1 of the embodiment including above construction, and the main game process program of the player terminal side executed by the CPU 51 of the player terminal 4 will be described with reference to FIGS. 10 and 11. Each of the programs shown in FIGS. 10 and 11 are stored in the RAM 42 and the ROM 43 mounted on the main control portion 31, and the RAM 52 and the ROM 53 mounted on the player terminal 4. The programs are executed by the CPU 41 or the CPU 51 at a predetermined interval.

At first, the main game process program executed by the main control portion 31 will be described with FIGS. 10 and 11. In S1, the CPU 41 sends a start command to each of the player terminals 4. The start command instructs each of the player terminals 4 to start a bet available time period. During the bet available time period, the players can bet.

In S2, the CPU 41 receives bet information from the each of the player terminal 4. Here, the bet information includes the bet object which is bet by the player (either "Banker" or "Player") and the bet value (credit count) of the bet object.

In S3, the CPU 41 accumulatively stores the bet value which is bet (either "Banker" or "Player") by all player terminals 4 connected thereto in divided RAM 42. The RAM 42 is divided according to each of the player terminals 4.

In S4, the CPU 41 starts the game process. In the game process, the CPU 41 determines the winner ("Banker" or "Player") and sends the game result to each game each player terminal 4.

Further, in S4 of the game process, to enhance the feeling of being at a real thing, the virtual dealer image, which deals the cards or the like, are displayed on the front display 21 according to the game session (see FIGS. 8 and 9). The virtual dealer image is changed to different kinds of image every the predetermined number of game. The predetermined number is determined by lottery in S11, which will be described later.

In S5, the CPU 41 determined whether or not the number of executed games becomes the predetermined number, which is determined in S11 (which will be described later). If it is determined the number of executed number does not become the predetermined number (S5:NO), the main game process will be finished. And then, if the game will be ongoingly executed, the procedure will be shifted to S1.

On the other hand, if it is determined that the number of executed game becomes the predetermined number (S5: YES), the procedure will be S6. In S6, the CPU 41 determines the player (player terminal 4) who betted the largest bet value.

In S7, the information, which indicates that the right of the choice for the dealer image is obtained, is sent to the player terminal 4 which is played by the determined player. In S8, the dealer choice screen 100 is displayed on the front display 21. In the dealer choice screen 100, six kinds of dealer images which are selectable by the player are displayed.

In S9, the CPU 41 receives the choice result of the dealer image which is sent by the player terminal 4 of the player who obtains the right of the choice. Here, the choice result received in S9 may include a kind of costume of the selected dealer wears and hairstyle, in addition to the choice result of the dealer image among the first dealer image 101 to the sixth dealer image 106 (see FIG. 1).

In S10, the CPU 41 controls the front display 21 so that the dealer image to be displayed thereon is changed based on the choice result received in S9. Concretely, if the dealer image displayed in previous game is different from the selected dealer image by the player, the dealer image to be displayed will be changed to the selected dealer image. Also, the costume and the hairstyle images to be displayed will be changed based on the choice result.

In S11, the CPU 41 determines the number of the games to be executed with the changed dealer image in S10 by lottery. Here, the number of the games to be executed with the changed dealer image may be among 10 to 20 (for example). Here, in S5, the number execute games will be counted from next game, and it is determined whether or not the number of executed games becomes the determined number determined based on lottery result in S11.

In S21, the CPU 41 initializes accumulated bet value of each player stored in the RAM 42. If the game will be ongoingly executed, the procedure will be shifted to S1.

The main game process executed in the player terminal 4 will be described with reference to FIGS. 10 and 11. In S101, the CPU 51 receives the information instructing to start a bet available time period.

In S102, the CPU 51 displays a bet screen 70 on the liquid display 10, and determines the bet object which is be by the player (either "Banker" or "Player") and the bet value (credit count) which is bet.

In 103, the CPU 51 determines whether or not the bet available time period is end. Concretely, the predetermined time period (for example, 20 sec) from the timing of that the bat operation is available of S102 is elapsed.

If it is determined that the bet available time period is not over (S103:NO), the bet operation is available continuously. On the other hand, if it is determined that the bet available time period is over (S103:YES), the procedure will be shifted to S104.

In S104, the CPU 51 sends the bet information to the main control portion 31. Here, the bet includes the bet object which is bet by the player (either "Banker" or "Player") and the bet value (credit count) of the bet object.

In S105, the CPU 51 starts the game process. The CPU 51 receives the game result (either "Banker" or "Player" wins) from the main control portion 31, and provides the award based on the bet operation by the player and the game result.

In S106, the CPU 51 receives the information which indicates the player terminal 4 of the player who obtains the right of choice. Subsequently, in S107, the dealer choice screen 100 (see FIG. 1) is displayed on the liquid display 10.

In 107, for only player terminal 4 of the player who obtains the right of choice determined in S6, a choice operation of dealer image with the use of the touch panel 11 is enable, and the only player terminal 4 can accept the choice operation. Concretely, on the player terminal 4 of the player who obtains the right of choice can select any of the first dealer image 101 to the sixth dealer image 106 from the dealer choice screen 100 with the use of the touch panel 11.

In S109, the choice operation for the costume and hairstyle of the selected character dealer image in S108 is enabled, so the player can make choice operation. Here, the kinds of costume to be selected include suits and/or dress, in addition to the normal bow tie (see FIGS. 8 and 9). The hair style to be selected include short hair, long hair, or ponytail.

In S110, the CPU 41 sends the choice result by the player in S108 and S109 to the main control portion 31. Here, if choice operation is not made by the player who obtains the right of choice, default choice result, which is predefined (for example, the character is the first dealer image, and the costume and the hairstyle are normal), to the main control portion 31.

The dealer image who has selected costume and selected hairstyle is displayed on the front display 21 based on the sent choice result.

As mentioned above, in the baccarat game machine 1 and method thereof, the bet values, which are bet by each of the players on each of the player terminal 4 during predetermined games, are compared (S6), and then the player who betted the largest bet value obtains the right of choice for dealer image (among plural kinds of dealer images 101 to 106) and costume image or the like (S108, S109), and then subsequent game is executed with the selected image, so the player who wants to obtain the right of choice may bet more value. Various contents of game effect can be made without major modification from existing programs.

Further, when the dealer image is changed, accumulated value stored in the memory will be cleared (S12), so there may be no feeling of unfairness among new players and old players.

Here, aspects of the present invention are not limited to the above embodiment and various changes and modification can be done within the scope of the present invention.

For example, in above embodiment, the player who betted the largest bet value during predetermined number of executed games, and the predetermined number of executed games is determined by lottery. However, the invention is not so limited. For example, The predetermined number of executed games may be determined beforehand.

Figure 12:
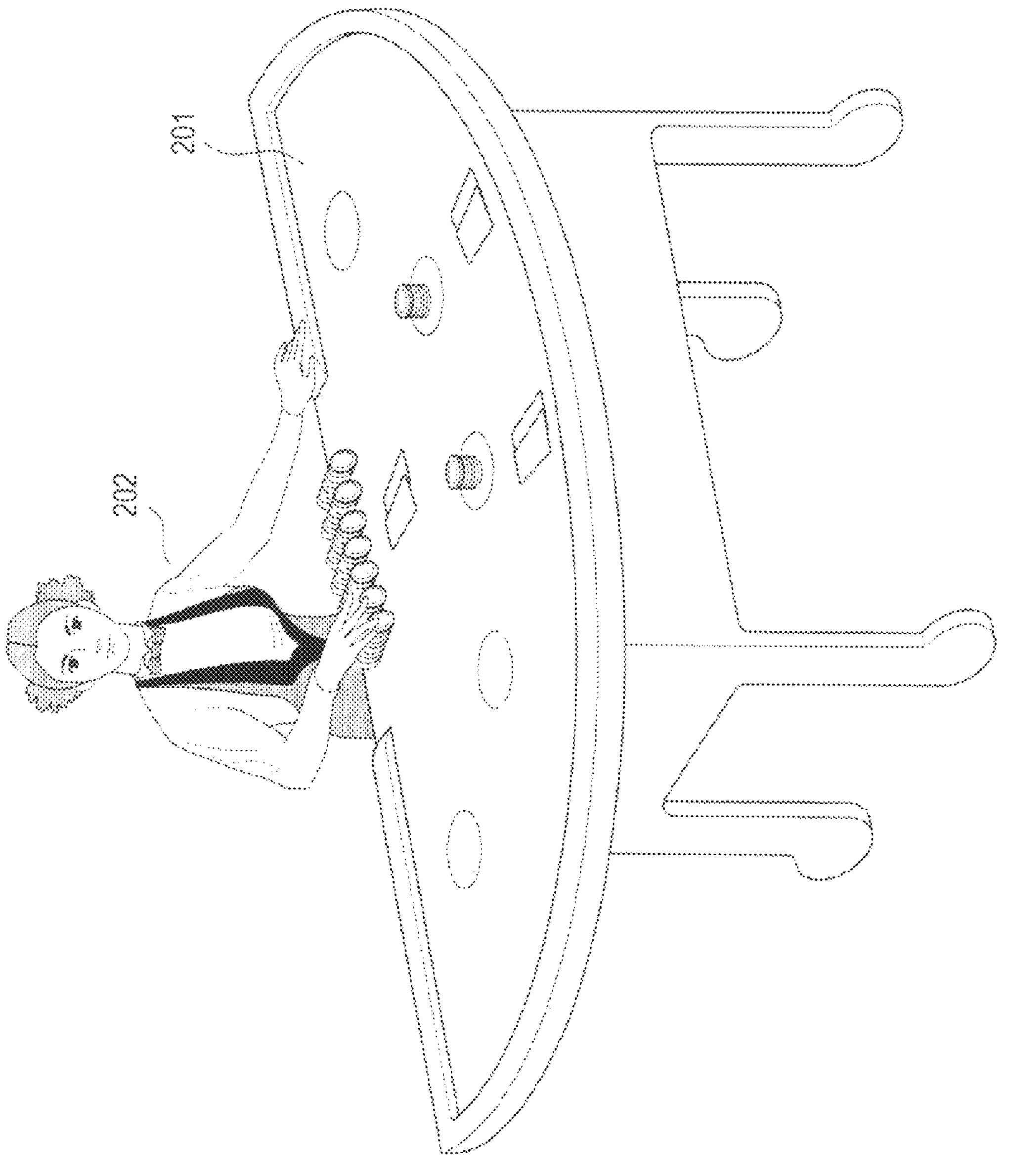
FIG. 12 is the view showing a table game which is applied to one or more aspects of the invention.

Also, the invention may be applied in the field where baccarat games (so-called table games) in which an actual dealer 202 and players (not shown) play on a game table (see FIG. 12).

In the table game shown in FIG. 12, the players bet by placing tips on predetermined location on the game table 201. One of the players, who betted the largest bet value during the predetermined games, can select desired dealer among plural dealers. Also, the one of the player may select the costume and/or the hairstyle of the dealer. The selected dealer may conduct the game session on the game table 201. Here, a concrete game method is the same as the above embodiment, except actual dealer who deals cards and exchanges tips.

Further, one or more aspects of the invention are applied to card games and method thereof including Blackjack or Poker, and games other than the card games including roulette games, bingo game.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A gaming machine, comprising:

a first memory that stores dealer images;

a display that displays the stored dealer images;

operating portions for respective players, each of the operating portions being operated by a player when the player selects one of the dealer images, the display displaying the selected one of the dealer images conducting a game;

bet portions, each of the bet portions being operated by the player when the player bets on the game;

second memories, each being provided with each of the operating portions, said second memories accumulatively storing values, each of the values being betted by the players; and a processor programmed to:

determine one of the players who betted a largest accumulated value; and give a right of choice for the dealer images to the one of the players, wherein the selected one of the dealer images is displayed on the display until a player to whom a next right of choice for the dealer images is given executes the next right of choice after the one of the players executes the right of choice.

2. The gaining machine according to claim 1, wherein the first memory stores plural kinds of costume images, each of the costume images being worn by the dealer images, and wherein the processor is further programmed to give a right of choice for the costume images to the one of the players.

3. The gaming machine according to claim 1, wherein the processor is further programmed to clear each of the second memories when one of the players obtains the right of choice.

4. A gaming machine, comprising:

a first memory that stores dealer images;

a display that displays the stored dealer images;

a station, the station including operating portions and bet portions for respective players, each of the operating portions being operated by a player when the player selects one of the dealer images, and each of the bet portions being operated by the player when the player bets on a game, the display displaying the selected one of the dealer images conducting the game;

second memories, each being provided with operating portions, said second memories accumulatively storing values, each of the values being betted by the players; and a processor programmed to:

count a number of executed games;

determine one of the players when the number of executed games becomes a predetermined number, the one of the players betting a largest accumulated value during the predetermined executed games; and give a right of choice for the dealer images to the one of the players, wherein the selected one of the dealer images is displayed on the display until a player to whom a next right of choice for the dealer images is given executes the next right of choice after the one of the players executes the right of choice.

5. The gaming machine according to claim 4, wherein the first memory stores plural kinds of costume images, each of the costume images being worn by the dealer images, and wherein the processor is further programmed to give a right of choice for the costume images to the one of the players.

6. The gaming machine according to claim 4, wherein the processor is further programmed to clear each of the second memories when said one of the players obtains the right of choice.

7. A gaming machine, comprising:

a first memory that stores dealer images and costume images, each of the costume images being worn by the dealer images;

a display that displays the stored dealer images and the stored costume images;

a station, the station including operating portions and bet portions for respective players, each of the operating portions being operated by a player when the player selects one of the costume images, and each of the bet portions being operated by the player when the player bets on a game, the display displaying a selected one of the dealer images conducting a game;

second memories, each being provided with each of the operating portions, said second memories accumulatively storing values, each of the values being betted by the players; and a processor programmed to:

count a number of executed games;

determine one of the players when the number of executed games becomes predetermined number, the one of the players betting a largest accumulated value during the predetermined executed games; and give a right of choice for the dealer images wearing one of the costume images to the one of the players, wherein the selected one of the dealer images is displayed on the display until a player to whom a next right of choice for the dealer images is given executes the next right of choice after the one of the players executes the right of choice.

8. The gaming machine according to claim 7, wherein the processor is further programmed to clear each of the second memories when said one of the players obtains the right of choice.

9. A gaming method, comprising:

in a gaming machine, comparing accumulated values, each of the accumulated value being betted by each player playing in the gaming machine;

determining one of the players who betted a largest accumulated value; and giving a right of choice for a dealer image to the one of the players, the one of the players selecting the dealer image, wherein the dealer image is displayed on a display of the gaming machine until a player to whom a next right of choice from a plurality of dealer images is given executes the next right of choice after the one of the players executes the right of choice.

10. The gaming method according to claim 9, further comprising:

giving a right of choice for a costume image, wherein a game session is conducted by the dealer image wearing the selected costume.

11. The gaming method according to claim 9, further comprising:

clearing each of the accumulated values.

12. A gaming method, comprising:

in a gaming machine, comparing accumulated values, each of the value being betted by each player playing in the gaming machine;

determining one of the players who betted a largest accumulated value; and giving a right of choice for a dealer to the one of the players, the one of the players selecting a dealer image, wherein the dealer image is displayed on a display of the gaming machine until a player to whom a next right of choice from a plurality of dealer images is given executes the next right of choice after the one of the players executes the right of choice.

13. The gaming method according to claim 12, further comprising:

giving a right of choice for a costume, wherein a game session is conducted by the dealer wearing the selected costume.

14. The gaming method according to claim 12, further comprising:

clearing each of the accumulated values.

15. The gaining machine according to claim 1, wherein the display displays a dealer choice screen which displays the dealer images.

16. The gaming machine according to claim 1, wherein the one of the players selects one of the dealer images that are displayed in a same screen of the display.

17. The gaming method according to claim 9, wherein the one of the players selects the dealer image from dealer images that are displayed in a same screen of the display.

18. The gaming method according to claim 9, further comprising displaying a dealer choice screen which displays the dealer images.

19. The gaming method according to claim 12, wherein the one of the players selects the dealer from dealer images that are displayed in a same screen of the display.

20. The gaming method according to claim 12, further comprising displaying a dealer choice screen which displays the dealer images.

21. A game control method executed in a gaming system, said gaming system comprising:

a plurality of player terminal devices each of which comprising a bet button operated by a player and a terminal display device;

a memory storing bet sum information corresponding to an operation of the bet button provided in said each of the player terminal devices and a plurality of dealer images;

a main display device displaying one of the dealer images; and a controller controlling the player terminal devices, the memory, and the main display device, wherein the controller executes the game control method, the game control method comprising:

receiving the bet sum information from said each of the player terminal devices;

storing the bet sum information in the memory corresponding to said each of the player terminal devices;

comparing each of the bet sum information with each other stored in the memory;

determining the player terminal device in which the bet information indicates a largest bet sum;

giving a right of choice to choose one of the dealer images to the player terminal device determined in the determining;

receiving a choice of the dealer image from the player terminal device determined in the determining; and changing the dealer image displayed on the main display device to one of the dealer images stored in the memory corresponding to a choice result received from the player terminal device determined in the determining.

22. The game control method according to claim 21, wherein the memory further stores costume images worn by the dealer images, the game control method further comprising:

giving a right of choice to choose one of the costume images stored in the memory; and conducting a game session by using the dealer image wearing the costume image chosen based on the right of choice.

23. The game control method according to claim 21, further comprising:

clearing the bet sum information stored in the memory after the choice result is received.

* * * * *